Sept. 20, 1932.  J. G. COLLINS  1,878,380
APPARATUS FOR LOCATING NOISES IN MOTOR VEHICLES
Filed March 21, 1931
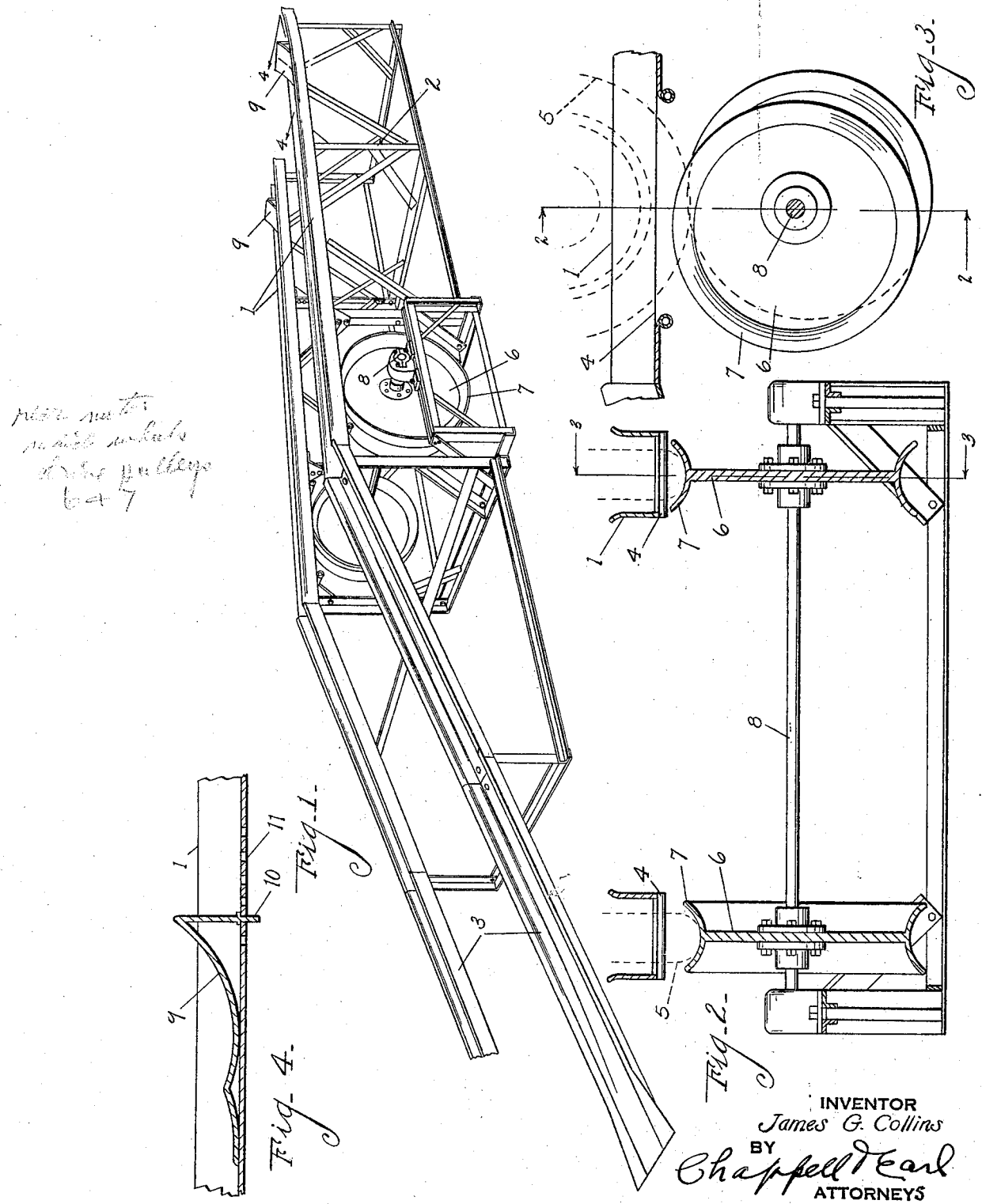
INVENTOR
James G. Collins
BY
Chappell & Earl
ATTORNEYS Patented Sept. 20, 1932

1,878,380

UNITED STATES PATENT OFFICE

JAMES G. COLLINS, OF KALAMAZOO, MICHIGAN, ASSIGNOR TO ATLAS PRESS COMPANY, OF KALAMAZOO, MICHIGAN

APPARATUS FOR LOCATING NOISES IN MOTOR VEHICLES

Application filed March 21, 1931. Serial No. 524,339.

The main object of this invention is to provide a combined greasing rack and means for locating squeaks and noises in motor vehicles which is effective for the purpose and easy to operate.

Objects pertaining to details and economies of my invention will definitely appear from the description to follow. The invention is defined in the claims.

A structure which embodies the features of my invention is clearly illustrated in the accompanying drawing, in which:

Fig. 1 is a perspective view of a vehicle greasing rack embodying the features of my invention, one of the runways being partially broken away.

Fig. 2 is a transverse section on line 2—2 of Fig. 3.

Fig. 3 is a fragmentary view partially in section on line 3—3 of Fig. 2.

Fig. 4 is an enlarged fragmentary view on line 4—4 of Fig. 1 showing details of the front wheel rests or chocks.

Referring to the drawing, the channel tracks 1 are mounted on a supporting frame designated generally by the numeral 2. The details of the frame are not described.

The tracks or ways 1 are provided with inclined approaches or runways 3. Each track has an opening 4 adapted to receive the rear wheels of a motor vehicle as indicated by dotted lines at 5, Figs. 2 and 3. Below these openings I mount a pair of pulleys 6 having tread flanges 7 of suitable dimensions to receive the wheels of the vehicle as indicated. These pulleys are mounted on a shaft 8 journaled to suitable bearings carried by the frame 2 and disposed transversely of the ways, the pulleys being mounted eccentrically on the shaft and in non-alining relation; that is, their long radii are disposed out of alinement so that as they are rotated a vehicle supported thereby is rocked from side to side.

Segmental rests or chock blocks 9 are provided for the front wheels, these chock blocks having lug portions 10 selectively engageable with the holes 11 in the bottom of the ways so that the chock blocks may be adjusted for different lengths of vehicles to properly position the rear wheels in supporting engagement with the pulleys 6 while the front wheels are in supporting engagement or at rest on the chock blocks 9.

With the vehicle supported with its front wheels in the chock blocks 9 and its rear wheels resting upon the pulleys 6, the rear wheels may be driven slowly which rocks the vehicle from side to side, thereby facilitating the location of squeaks and noises.

The apparatus illustrated is especially designed for greasing racks but my improvements are desirable for use in an apparatus for locating body squeaks or noises in the factory or in testing bodies for such squeaks and noises.

Having thus described my invention what I claim as new and desire to secure by Letters Patent is:

1. An apparatus of the class described comprising channel tracks, means supporting said tracks, wheel rests adjustable longitudinally of said tracks and having front and rear segmental portions adapted to engage the front wheels of a vehicle, said front portions being adapted to prevent forward movement of said wheels and said rear portions being adapted to prevent rearward movement thereof, said tracks having openings positioned to receive the rear wheels of a motor vehicle when its front wheels are in supporting relation to said rests, a shaft journaled to said supporting means and disposed transversely of said tracks below said openings, and wheel supporting pulleys eccentrically mounted on said shaft in non-alined relation whereby a vehicle with its rear wheels resting on said pulleys may be rocked from side to side by driving such rear wheels.

2. An apparatus of the class described comprising tracks having openings therein to receive the driven wheels of a motor vehicle and provided with adjustable chock blocks having front and rear portions adapted to engage the other wheels of the vehicle, said front portions being adapted to prevent forward movement of said wheels and said rear portions being adapted to prevent rearward movement thereof, means supporting said tracks, and wheel supporting pulleys journaled to said supporting means and associated with said openings to support a pair of wheels of the vehicle, said wheel supporting pulleys being eccentrically mounted in non-alined relation and for simultaneous rotation whereby upon rotation of the wheels supported thereby the vehicle is rocked from side to side.

In witness whereof I have hereunto set my hand.

JAMES G. COLLINS.